United States Patent [19]

Carlson et al.

[11] Patent Number: 5,379,044
[45] Date of Patent: Jan. 3, 1995

[54] EFFICIENT MULTI-TARGET TRACKING METHOD

[75] Inventors: Robert C. Carlson, Colorado Springs, Colo.; Robert A. Rosen, Agoura Hills, Calif.

[73] Assignee: Hughes Aircraft Company, Los Angeles, Calif.

[21] Appl. No.: 173,322

[22] Filed: Dec. 23, 1993

[51] Int. Cl.⁶ .............................................. G01S 13/00
[52] U.S. Cl. .................................................. 342/90
[58] Field of Search .................. 342/90, 95, 96, 106, 342/107

[56] References Cited

U.S. PATENT DOCUMENTS

| | | | |
|---|---|---|---|
| 4,005,415 | 1/1977 | Kossiakoff et al. | 342/90 |
| 4,060,809 | 11/1977 | Baghdady | 342/90 |
| 4,179,696 | 12/1979 | Quesinberry et al. | 342/90 |
| 5,138,321 | 8/1992 | Hammer | 342/96 |
| 5,202,691 | 3/1993 | Hicks | 342/90 |
| 5,325,098 | 6/1994 | Blair et al. | 324/95 |

*Primary Examiner*—Mark Hellner
*Attorney, Agent, or Firm*—Leonard A. Alkov; W. K. Denson-Low

[57] ABSTRACT

A method for multi-target tracking of targets from a sensor system generating a sequence of successive data frames. The method includes the steps of deleting stale data and any hypotheses generated for the previous frame, leaving an unstructured collection of tracks. Observations in each frame are processed to form a set of tracks. A fresh set of hypotheses is formed from the new track set, wherein none of the tracks within any hypothesis have any observation in common. Track clusters may be formed to reduce the processing burden.

27 Claims, 3 Drawing Sheets

X — OBSERVATION
O — INTEGER APPROXIMATIONS OF OBSERVATION
|| — BOUNDARY OF BOX WITH SIDE LENGTH 2

EFFICIENT MULTI-TARGET TRACKING METHOD

BACKGROUND OF THE INVENTION

The present invention relates to tracking radars, and more particularly to an efficient and adaptive method for multi-target tracking radars.

In some radar applications, it is necessary to deal with large number of targets. Such applications include, for example, ground moving target detection/tracking, forward area air defense, space-based missile tracking, air-to-air radar tracking, and electronic warfare.

Conventional techniques for tracking multiple targets with a tracking radar are discussed, for example, in "Multiple Target Tracking with Radar Applications," S. Blackman, Artech House, 1986. Generally, the conventional multi-target tracking algorithms stress performance optimality; efficiency is addressed in an ad hoc manner. Such an approach causes difficulties as the number of targets increases. Disadvantages of the conventional techniques employed for large numbers of targets include computational costs, and relative inflexibility (insufficient adaptivity) to the structural features of the specific tracking situation.

It is therefore an object of the present invention to provide a method for tracking multiple targets characterized by computational efficiency and flexibility, and which will allow large numbers of targets to be tracked.

SUMMARY OF THE INVENTION

A method is disclosed for multi-target tracking of targets from a sensor system generating a sequence of successive data frames. Each frame comprises a set of observations representing data collected by the sensor system during a sensing period. The method comprises the step of receiving an initial frame and forming a set of tracks or track records, each for a particular target, in dependence on the data comprising the initial frame.

For each successive frame received, the following steps are performed in accordance with the invention. First, stale data regarding the previously received frame is deleted. This includes deleting the hypotheses, if any, generated for the previous frame, leaving an unstructured collection of tracks.

The observations in the next successive frames are processed to form a set of tracks in dependence on predetermined target models and the current set of observations as well as observations received from previous frames. This step comprises considering all possible assignments of observations to tracks, and assigning a score to each track indicative of the quality of the associations of the respective observations to the respective track. A fresh set of hypotheses is formed from the new set of tracks, wherein none of the tracks within any hypothesis have any observations in common.

To reduce the processing burden, the new set of hypotheses may be harvested to eliminate from consideration low scoring tracks.

To further reduce the processing burden, track clusters may be formed from the set Z of tracks. This step includes forming track clusters x(i), which are subsets of Z, and for i not equal to j, no track in track cluster x(i) shares any observations with a track in cluster x(j). This greatly reduces the number of hypothesis combinations, permitting frame updates of N tracks possible in N log (N) time, a surprisingly quick rate.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Multiple target tracking systems of interest to the present invention are characterized by a potentially large number of targets of target detections. Combinatorial difficulties arise when tens of targets are present; present and future systems can have hundreds or thousands of targets. Present systems are generally overwhelmed by such large numbers of targets.

Multiple target tracking can be divided into two parts: the association of observations to tracks, and the updating of a track prediction. The present invention is only concerned with the association problem.

The particular embodiment disclosed herein is for multiple hypothesis tracking for systems resembling those with mechanically scanned antennas. The invention may also be applied, for example, to agile beam systems (by working with clusters).

Figure 1:
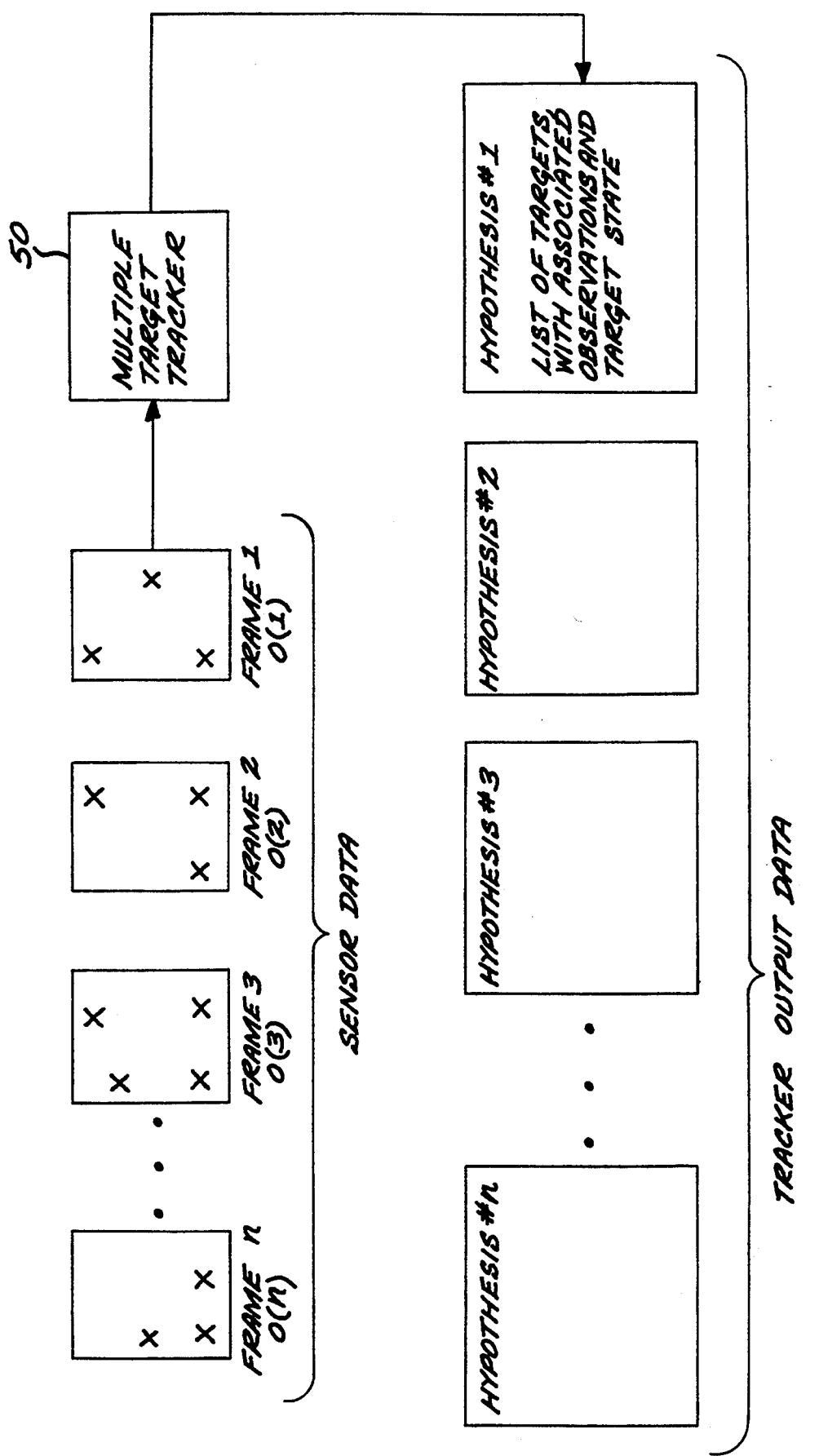
FIG. 1 is a simplified block diagram illustrative of the data input to and output from a multiple target tracker in accordance with the invention.

FIG. 1 illustrates the data input to, and output from, a multiple target tracker 50 in accordance with the invention. Data is received in the form of a sequence of sets of observations, with each set of observations called a "frame."

Frames are denoted O(n), with the subscript suppressed if only the current frame is considered. Each frame O(n) contains elements OBS(k,n), k=1, ..., K(n), where n is the frame index. Each observation element OBS (k,n) is assumed to be tagged with its frame index.

The data is integrated with previously obtained data during an association period. Based on the observations and target models, observations will be grouped together to form "tracks." By definition a track will consist of a set of observations, with no more than one observation from each frame. Since the observations are tagged with their frame number, the tracks can be thought of as ordered strings of observations.

Potentially this string of observations is unbounded, but in practice the information explicitly available may be limited to those observations coming from the most recent frame, together with some additional functions of the observation history. Traditionally the available information is limited to the current observation and a prediction based on the observation history. For multi-hypothesis tracking it may be desirable to keep an explicit record of the most recent observations. These ideas can be combined into a notion of a "track record," which consists of a finite number of functions of the string of observations which in principle constitutes the track. A track record will typically include the following data:

1. Label;
2. Saved (available) observations;
3. Current prediction;
4. Other functions of the observations such as detect/no detect recent history for track aging;
5. Kalman filter coefficient description;
6. Track score.

The complete track record can be used to distinguish tracks; thus, tracks might share the most recent observations, but because of some observations in the past their predictions differ. An important subset of the track record is the set of "available observations," which are the observations explicitly carried.

Tracks can themselves be collected to form "hypotheses." This notion of hypothesis relates to the commitment regarding the association of observations to tracks. A "hypothesis" will be regarded as a set of tracks, no two of which have any available observations in common. For tracks with very short memory, this condition may degenerate to the constraint that the tracks of the hypothesis do not share any of the current observations.

Conventional multiple target tracking tries to determine the association of observations to tracks on a frame-by-frame basis by generating a single maximal score hypothesis. Multi-hypothesis tracking is based on the idea that tricky association problems are best resolved by postponing final assignment decisions until later frames. A version of multi-hypothesis tracking is discussed in *Blackman*, id. In accordance with the invention, tracks, but not hypotheses, are propagated. This greatly reduces the combinatorial difficulties discussed below.

In an actual tracking scenario, a track record is typically created whenever a new target is detected. Subsequently, observations which appear to come from this target are used with the previous target history to update the estimate of the current target state. During each frame, at most one observation is assumed to come from the target in question. It is assumed that, within a single hypotheses, distinct tracks cannot explicitly share observations.

Related to the notion of hypothesis is the notion of a "track cluster," as discussed in *Blackman*, id A set of tracks Z is separated into "track clusters" (X(i)) if each X(i) is a subset of Z, and for i not equal to j, no track in X(i) shares any available observations with a track in X(j). A set of tracks is an "irreducible cluster" if it cannot be divided into the union of non-empty clusters. Clusters are important because they provide a way of decoupling the hypothesis generation problem into smaller independent parts. Notice that it is possible for a single hypothesis to contain several tracks from the same cluster. As part of this invention, an efficient method of track clustering is described.

A "score" is a function mapping tracks at frame n into non-negative real numbers. The score of a hypothesis is the sum of the scores of its tracks. Dependence on the current frame index allows stale tracks to have scores that decrease in time. Scores are indicated by $S(T1)$. It is important to allow the score to deteriorate (reduce) if no observations are received. If a track is considered to be a set of observations, the case of no observation for a given frame should be carried in the track record, for instance by noting the current frame and the frame index of each observation.

A score function provides a mechanism for assessing the likelihood of the association of an observation to a track. When an observation from the current frame is added to a track, the score of the resulting track can be computed. If the score is high, it is likely that the observation belongs to the target generating the track. If the score is low, the observation does not seem to belong to this track.

The computation of scores in a realistic scenario might be fairly complex. For instance, based on the observations in a track, the state of the target may be predicted during the next frame. When that frame arrives, the track is paired with an observation. Based on an a priori probalistic model, the probability is computed for the predicted state causing the given observation. The result is used to update the score of the track. If no observation is assigned to the track, then its score is a fraction (depending on the probability of detecting the target) of the score during the previous frame.

At this point the combinatorial problems in multi-target tracking can be illustrated. Assume a single hypothesis, and that a new frame becomes available. It is desired to calculate the score of each potential hypothesis formed by combining the new observations with the old tracks in all possible ways. If there are K observations and N tracks, and assuming that the number of tracks exceeds the number of observations, then the umber of hypotheses that is generated is $N*(n-1)* \ldots, (n-K+1)$, even before considering new tracks. When ten observations and ten tracks there are 10! possibilities, which is somewhat over 3.5 million. Obviously, exhaustive search for the best hypotheses is only possible with an extremely small number of observations or tracks.

In fact, it is anticipated that some future applications will call not for the updating of a single hypothesis, but the scoring of multiple hypotheses, with the tracks belonging to the highest scoring hypotheses surviving until the next frame. Consequently, the combinatorial complexities can be much worse than in this simple example. Fortunately, there are search strategies which avoid the combinatorial nightmare of exhaustive enumeration.

Clustering of tracks, as pointed out above, is a technique which can greatly reduce the number of hypothesis combinations. The idea is to group the tracks in such a manner that the hypotheses within each cluster are decoupled from the hypotheses in all the other clusters. This is accomplished by requiring that no cluster share any observations with any other cluster. The sets of individual cluster hypotheses then implicitly represent a set of global hypotheses which include any combination of hypotheses from the separate clusters. The number of hypotheses implicitly represented in this way is the product of the numbers of hypotheses belonging to the separate clusters.

Methods of Multi-target Tracking

This section presents an overview of methods or algorithms in accordance with the invention that can be employed for multi-target tracking. Any real multi-target tracking system has limited computational resources, and thus faces the possibility of being overwhelmed by a flood of targets. These algorithms assign observations to tracks for both conventional multi-target tracking and multi-hypothesis tracking. The computational complexity of the algorithms provides a guide to the number of targets that can be handled before the system is overwhelmed.

Some basic assumptions will simplify the analysis. The principal assumption is that the number of observations is about the same as the number of targets.

Figure 2:
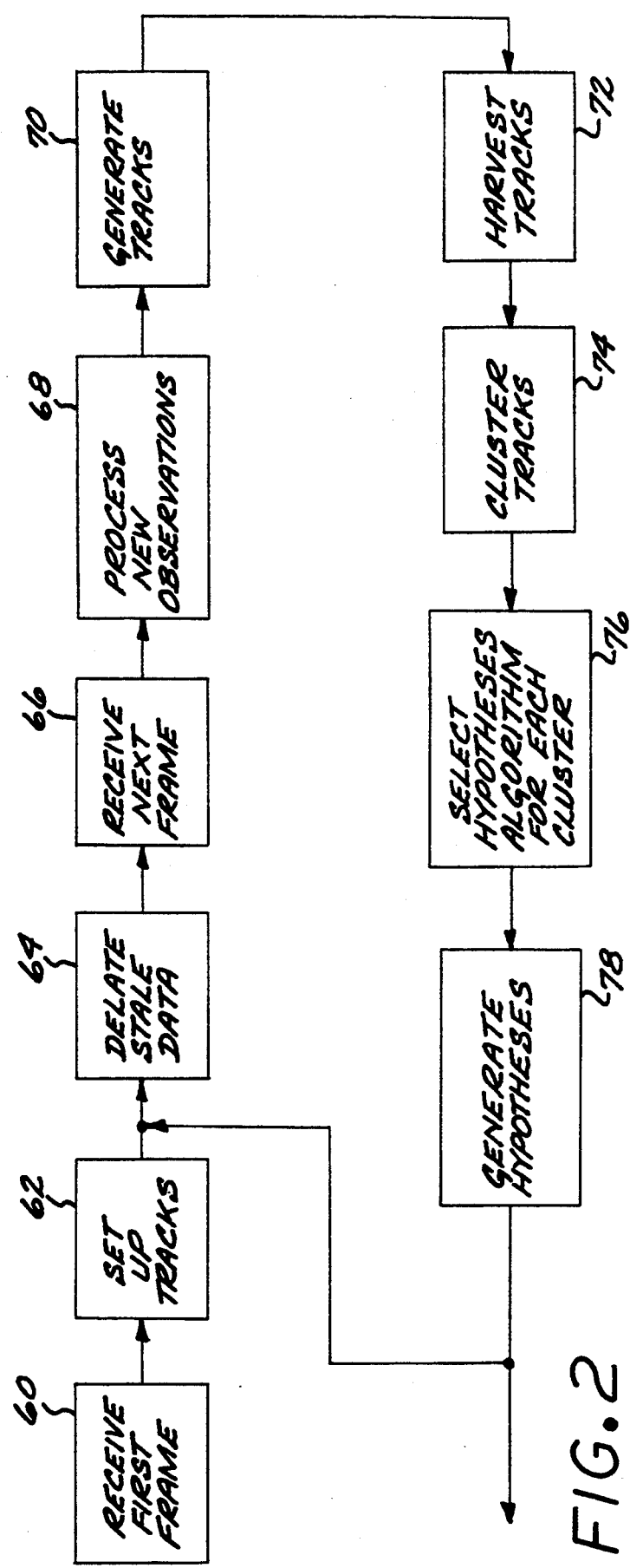
FIG. 2 is a simplified block diagram illustrative of the operation of the multiple target tracker of FIG. 1.

The operations below outline the steps taken to make possible assignments to tracks, to trim the number of tracks, and to finally generate one or more hypotheses. These operations are discussed with reference to the simplified functional flow diagram of FIG. 2 illustrating the processing that is performed by the multiple target tracker 50. The steps discussed below, commencing with the deletion of stale data, follows the receipt of any frame other than the first frame. An initialization process (62) occurs after receipt of the first frame (60), wherein the tracks are set up.

1. Delete Stale Data (Step 62)

In this step the previous hypothesis structure (if any) is deleted, leaving only an unstructured collection of tracks. Tracks will generally be aged by discarding the oldest available observation. Tracks which have a low score because of aging can be deleted. Tracks then determined to be redundant are eliminated; redundancy may be defined as agreeing on the available observations, or by some other criteria.

2. Process the New Frame of Observations (Step 68)

A frame of K new observations is received (Step 66). A set of K track records is created, one per new observation. These tracks are generated as new starts, and are scored and stored until the track harvesting step. To handle the possibility of a missing observation, a "no detect" is generated when appropriate, which can serve as a place holder for the missing observation.

The observations are numbered or otherwise labelled for future reference. In some applications it may be helpful to store the observations in a data structure which facilitates access to the data based on observation values. One example of such a data structure, called a quadtree, is employed in image processing. The advantages of such a data structure will be reviewed during the discussion of computational complexity.

3. Generate New Tracks (Step 70)

If the frame of observations is unstructured at this point, it is likely that all possible assignments of observations to tracks will have to be considered. If the observations are structured based on the observation values, then it may be possible to only consider the pairs of observations and tracks for which the observation is sufficiently close to the track prediction. Tracks will also be formed by combining old tracks with a no detect. The score for the tracks is recorded.

To illustrate the potential use of structured data, suppose that the observed data consists only of azimuth and elevation. Suppose too that an array is considered which represents the possible (quantized) azimuth and elevation values. As each observation arrives it can be loaded into the appropriate spot in the array. When observations and tracks are paired, only pairs whose observation data is close to the track prediction are considered. Such pairs can be found by searching a neighborhood of the prediction in the azimuth/elevation array. This technique can offer very considerable computational savings.

4. Harvest Tracks (Step 72)

In this step, low scoring tracks are eliminated from consideration. For the most part, this requirement arises if the observations are unstructured when they are paired with tracks, so that all observation-track assignments need consideration. In some applications, this step would probably be omitted, although there might be unanticipated reasons for harvesting.

The tracks are harvested, including both the extension of old tracks and the new tracks consisting of a single observation. One natural cutoff for harvesting is the score of tracks with no previous observation. Old tracks with no recent observations could also be discarded here. If there are too many tracks, they can be thinned to preserve the highest scoring tracks with the constraint that every old track and every observation must have at least one representative. The number of surviving tracks is expected to be a small multiple of the number of targets present.

5. Cluster Tracks (Step 74)

Whether multi-hypothesis tracking or conventional multiple target tracking is used, clustering can reduce the computational load by explicitly decoupling parts of the problem which cannot interact. For single hypothesis generation, the partitioning offered by clustering can simplify processing when the optimal assignment algorithms are employed; clustering can also improve the tracking efficiency of agile beam systems by allocating beams to resolve targets within clusters. In multihypothesis tracking systems clustering is employed to avoid the combinatorial explosion of computation costs.

6. Select Hypotheses Algorithm for Each Cluster (Step 76)

The various hypotheses generation options are presented below in order of computational cost per cluster, with the least expensive algorithms presented first. Notice that each technique can be applied on a cluster-by-cluster basis. This means that the multiple target tracks can employ different hypotheses generation techniques on its different track clusters. According to one aspect of the invention, the particular hypotheses generation algorithm for each cluster is adaptively selected by the tracker 50 in dependence on the number of tracks it contains.

(a) Quick Generation of a Plausible Hypothesis

When there is a very large number of tracks in a cluster, any plausible hypothesis may be satisfactory. One way to generate a plausible hypothesis starts by sorting the tracks in score order. Each track in the list of tracks is then considered, always picking up the next track consistent with the previous choices. In circumstances requiring this type of algorithm, a single hypothesis may suffice.

(b) Optimal Assignment for a Single Hypothesis

This problem has received serious attention in the graph theory literature, and sophisticated algorithms are available. A graph consists of a set of vertices connected by a set of edges. A bipartite graph is one in which the vertices are divided into two disjoint subsets X and Y, and the endpoints of the edges consist of one point from X and one from Y. As the multi-target tracking problem has been posed, a bipartite graph where X is the set of observations and Y is the set of tracks can be employed. In this context an observation and the new track it spawns are separately considered. N distinct "no detects" are also considered, one for each existing track.

Proceeding with the terminology, a graph in which each edge is assigned a real number, the track score, is called a "network." A set of edges is called "independent" if the edges have no vertices in common. If the only constraint on hypothesis formation is that distinct tracks cannot be assigned the same current observation, then the hypothesis is exactly a set of independent edges. In case the score of a hypothesis is the sum of the scores of its tracks, the problem of finding a maximal score hypothesis is called the assignment problem in the graph theoretic literature, see "Data Structures and Network Algorithms," R. E. Tarjan, Society for Industrial and Applied Mathematics, 1983.

(c) Bounded Search for Multiple Hypotheses

The next technique generates multiple hypotheses; the algorithm does not guarantee discovery of the optimal hypotheses, but it does generate plausible choices without exhaustive search. Let the length of a hypothesis be the number of tracks that it contains. This approach will grow high scoring hypotheses of increasing length. The algorithm is described in two steps, which are repeated no more than N+K times, where N is the number of old tracks and K is the number of new observations.

1) Initially the growing hypotheses will simply be a copy of the tracks. At iteration L each length L hypothesis is paired with all tracks in the cluster. A score for each pairing is computed. The score of a length L+1 hypothesis may be simply the sum of the scores of the component tracks, or it may be a more complex calculation involving all of the available data. The score is recorded. Since the constituent tracks may not share available observations there must be a provision to handle this kind of redundancy. At this point a choice is made simply not to add in the new track. This has advantages because it does not force a hard decision about the exact number of tracks in the final hypotheses. With this procedure a length L hypothesis is really of length at most L.

2) The length L hypotheses are harvested, keeping only a small multiple of (N+K). The appropriate track data is appended to the growing hypothesis records. Notice that this technique is likely to generate duplicate partial hypotheses. These should be harvested before harvesting based purely on score is used. Of course, duplicates have the same score, which provides a good key for searching for them.

(d) Exhaustive Generation of Multiple Hypotheses

If there is a small number of tracks, all hypotheses can simply be generated.

In a preferred embodiment then, the particular hypotheses generation algorithm for each cluster is selected adaptively, based on the number of tracks in that cluster and the computational throughput available for the cluster. By way of example, when the number of tracks does not exceed five, the algorithm (d), exhaustive generation of all hypotheses, is selected. If the number of tracks is between six and, say, fifty, then algorithm (c), bounded search for multiple hypotheses, is selected. If the number of tracks is between fifty-one and, say, one hundred fifty, algorithm (b), optimal assignment for a single hypothesis, is selected. And when the number of tracks in a cluster exceeds one hundred fifty, then algorithm (a), quick generation of a plausible hypothesis, is selected.

7. Generate Hypotheses (Step 78)

In this operation, hypotheses are generated using the algorithm selected in step 76. Both multi-hypothesis generation and single hypothesis generation are available. After the generation of hypotheses, tracks not contained in any hypothesis are deleted. Also, in this invention, hypotheses are reformed after each frame, thus greatly simplifying the hypotheses bookkeeping.

Algorithmic Complexity for Serial Computation

The algorithms are sufficiently straightforward that the computation costs can be estimated for a sequential computer. To simplify matters, the size of the track records will be ignored. As long as the computation of scores can be performed incrementally (such as by making the score of a hypothesis equal to the sum of the scores of its tracks) the size of the track record provides a rough timing unit.

To settle on some notation, consider that in addition to having K observations and N old tracks, H hypotheses are generated using N1 updated tracks that survive gating and harvesting. Each track record will contain J available observations. It is assumed that K, N, and N1 are of the same order of magnitude. Since the interest is steady state performance, it is assumed that N is roughly constant in time.

The complexity estimates below indicate that the worst case occurs when there is a single cluster. In this case a single, suboptimal hypothesis may be the only reasonable choice. The algorithms presented will generate a single plausible hypothesis in the order of N1*log2(N1) steps.

When clustering is available, multi-hypothesis tracking techniques can generally be used without an extreme computational burden. The cost of all processing steps through cluster generation is of the order N1*log2(N1). If there are clusters, the cost of generating one or more hypotheses is the sum over the clusters of the cost of hypothesis generation within each cluster. By selecting hypothesis generation algorithms based on the number of tracks in a cluster, the total computation cost can be controlled, keeping it of the order N1*log2(N1) if desired. In case the clusters are small, this technique can be used to generate all hypotheses within the constraints of clustering. As the clusters get larger more rapid techniques can be adopted.

Delete Redundant Tracks

As tracks age, redundancy can develop. The process of removing redundant tracks can be treated as a sorting problem. The total collection of tracks from the multiple hypotheses is sorted based on the available observations. If duplicates are discovered, a track is deleted. Since there is a total of N tracks, the processing time for sorting on J keys (say lexicographic ordering to choose one, wherein the ordering is alphabetical—first key, second key, and so on) dominates redundancy elimination, and is no more than J*N*log2(N). After sorting, redundancy elimination can be completed by making one pass through the list of tracks. Only the highest scoring track within each redundant set is retained.

Process New Observations

When new observations are received, the first thing to be done is the creation of new track files for each observation. This allows the possibility to be considered that the observation is a genuine detection of a previously unseen target. In addition, each old track can be assigned a "no detect" to handle the possibility that no observation is received from that target. The resulting tracks are then set aside for the time being.

Failure to provide a suitable data structure for observations can lead to significant computational costs when updated tracks are generated. The cost arises if every observation is considered as a candidate for assignment to every old track. In evaluating the score of every pairing N*K score evaluations would be performed. If N and K are of the same magnitude, the computational cost grows as the square of the number of tracks. In situations with many tracks this will be unacceptable.

If there is sufficient fast memory, the data structure discussed above can facilitate very efficient pairings of tracks with candidate observations. For most applications a memory location for every possible (quantized) observations is not available. For example, if the observations consist of azimuth and elevation measurements, a two dimensional array of cells would be considered whose side length is the angle coverage divided by the angular resolution of the system. The extreme memory cost arises because the information that no detection occurred at a certain location is explicitly stored.

There are several data structures which provide quick access to observations based on the observation value without using excessive memory. For simplicity these data structures will be illustrated when the observations consist of two (quantized) real values, but they generalize easily to any number of variables.

The first data structure is called a quadtree and is popular in conventional image processing. Data is addressed based on the data values. The first address describes the quadrant in which the data lies, the second address describes the second level quadrant within the first quadrant, and so on. If the observation data comes from a two-dimensional array with side length S, then the cost of fetching a single data item given its address is on the order of $\log_2(S)$. The per unit cost of data access will generally be less if looking in a neighborhood of a given value. The cost of generating the quadtree is basically the cost of sorting data, which is on the order of $K\log_2(K)$.

Another option is to simply sort the data by row and column. (Again lexicographic, i.e., alphabetical, ordering can be used.) If the data is linearly sorted, then a search for a data value based on repeated dissection of the list will locate the item in no more than $\log_2(K)$ steps. Again, there are savings if neighbors are accessed at the same time.

A modification of the last data structure provides improvements for track generation if an a priori bound on the size of gates is known which controls the observations paired with that track. For simplicity it is assumed that the gated region around a track prediction is square with side length S and sides parallel to the axes. The utility of the data structure is based on the observation that if the plane is paved with overlapping square of side length 2S, centers spaced by S, and sides parallel to the axes, then every square with side length S and sides parallel to the axes is completely contained within one of the squares with side length 2S.

Figure 3:
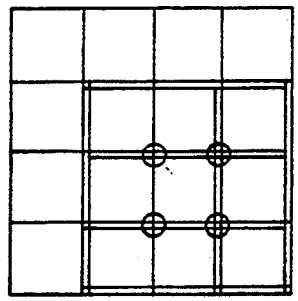
FIG. 3 illustrates a type of data structure which may be employed with the method of this invention.

The idea behind the data structure is that every observation will be replicated so that there are found copies, one for each of the four squares of side length 2S which contain the observation. The contents of each square of side length 2S are then considered as the basic objects, and these will be sorted by row and column of the center. The idea is illustrated in FIG. 3.

The mechanics of creating this data structure are simpler than might be expected. The data is scaled so that the gate width is one. Then the process of replicating and grouping the observations can be based on the computation of the integer parts of the observation data. The integer part of the data defines one copy, while the other three copies are obtained by adding one to one or both of the observation components. Sorting the data by overlapping squares is then simply sorting by these integerized data values. To access the observations near a prediction, the nearest integer coordinates to the prediction are simply taken, and the contiguous set of data with these integerized observations is examined.

Generate Tracks

All tracks based on "reasonable" assignments of new observations to old tracks are now formed. "Reasonable" can be defined by forming gates based on a computation of the probability that an observation within the gate comes from the tracked target. For simplicity the gates are square. A worst case estimate for the computation cost of track formation is based on the assumption that the region within the gate is completely occupied by observations. If the observations are sorted by row, then column (i.e., lexicographically), the cost of searching a neighborhood of a prediction for observations is more than the cost of finding the observations (if any) in the first column of the neighborhood for each row, and then scanning across the columns that are in the neighborhood and in the same row. In this case the cost will be bounded by the number of tracks times the square root of the volume of the gated region (vol) times the observations access time. More precisely the costs grow as $N*sqrt(vol)*[\log_2(K)+1]$.

Track Harvesting

No harvesting is required at this stage. However, if the overlapping square data structure is used there will be some tracks formed that would not pass the gate test. Also, if the gate is not square, there would be extra tracks formed. These can be deleted at this point if desired. The total number of tracks generated at this point is about $4*N=N1$. The contributors to this total include extensions of old tracks by new observations, extensions of old tracks by "no detects," and new tracks formed from each observation.

Track Clustering

Once tracks are formed, the decomposition into clusters can be handled efficiently. Such a decomposition depends on the explicitly available track data. These data are the track correlations of the last J frames. In order to label the tracks with an appropriate cluster index, it is efficient to work with two files.

File I has J+1 columns. The low index for File I is the track index. The column index for the first J columns is the frame index. Each entry in the first J columns (frames) is initially a pointer in a linked list of tracks that share the same observation for the frame. Thus, each entry points to another row corresponding to a track that shares the same observation for that frame. The list is linked head to tail so that the entry of the last track points to the first track of the list. It follows that if a track does not share an observation with any other track for a frame, the corresponding entry points to itself. The final column contains the cluster label for the track represented by each row. Initially, all entries in this column are set to 0, indicating that none of the tracks have yet been assigned to a cluster. An example of File I initialization given the track records of Table I is shown in Table II.

TABLE I

| | TRACK RECORDS | |
|---|---|---|
| Track | Frame 1 Observation | Frame 2 Observation |
| 1 | 1.1 | 1.5 |
| 2 | 1.1 | .9 |
| 3 | 1.3 | 1.5 |
| 4 | 1.5 | 2.0 |

TABLE II

| | FILE I AFTER INITIALIZATION | | |
|---|---|---|---|
| Track | Frame 1 Pointer | Frame 2 Pointer | Cluster Label |
| 1 | 2 | 3 | 0 |
| 2 | 1 | 2 | 0 |
| 3 | 3 | 1 | 0 |
| 4 | 4 | 4 | 0 |

File II is a list of tracks assigned to a forming cluster.

Figure 4:
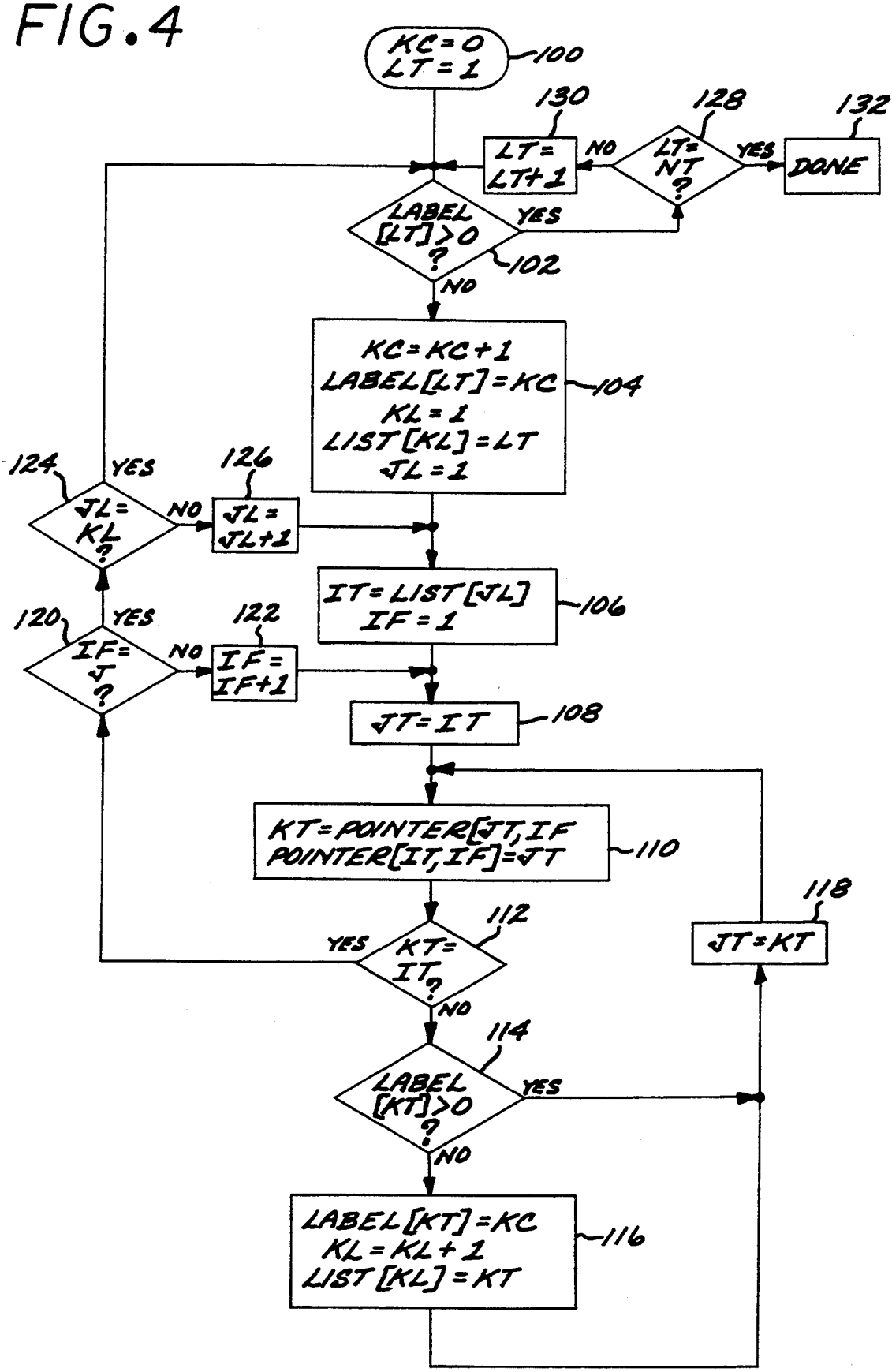
FIG. 4 is a flow diagram illustrating a clustering algorithm which may be employed with the method of this invention.

The clustering algorithm after the initialization of File I is described in the flow diagram in FIG. 4. In this flow diagram, the first J columns of File I are designated as the array POINTER, and the last column of File I is designated as LABEL. File II is designated as a list.

The counters and indices in the clustering algorithm flow chart of FIG. 4 include the following:

counters:
KC=number of clusters
KL=number of tracks in the current cluster (LIST write pointer)
JL=number of tracks in the current cluster that have been processed to identify other tracks in the cluster (LIST read pointer)

indices:
LT, IT, JT, KT: track index
IF: frame index
NT: number of track
J: number of frames considered in the clustering algorithm After initialization (step 100), the formation of each new cluster begins (step 102) with the identification of the first unassigned track, LT(a). At step 104 the cluster label (LABEL) of track LT is assigned the new cluster index KC, and the track index LT becomes the first element of the list of tracks, LIST, in the forming cluster. Also, the read and write pointers to LIST, JL and KL, are initialized at step 104.

In subsequent processing for this cluster, track indices are read from LIST (step 106). Each track index IT read from LIST is a starting point for a search for new tracks to be added to the forming cluster. At each column IF, this search begins at new IT in POINTER (step 108) and is performed by following the linked list of pointers to new tracks (steps 110, 112, 120 and 122). As each unassigned track is encountered in this search (step 114), the track is assigned to cluster KC, the LIST write pointer KL is incremented, and the track index is added to LIST (step 116).

After each entry in POINTER is read, it is reset to point to itself (step 110) to prevent redundant searches. The search is ended when the track index returns to the starting point (step 112) and a new search is begun in the next column (step 120, 122). After all the columns have been processed, the LIST read pointer JL is incremented (step 126), a new track index is read from LIST, and the process is repeated. When the LIST read pointer JL catches up the LIST write pointer KL (step 124), the cluster is complete and a new cluster is started. When no unassigned track LT can be found to initiate the next cluster (steps 128 and 130), clustering is complete (step 132).

The output of this processing is the cluster label LABEL of each track.

The results of this processing on File I and File II, given the track records of Table I, are shown in Tables III and IV, respectively. Table IV indicates that the first cluster comprises tracks 1, 2 and 3.

TABLE III

| FILE I AFTER FINISHING CLUSTERING WITH ROW 1 | | | |
|---|---|---|---|
| Track | Frame 1 Pointer | Frame 2 Pointer | Cluster Label |
| 1 | 1 | 1 | 1 |
| 2 | 2 | 2 | 1 |
| 3 | 3 | 3 | 1 |
| 4 | 4 | 4 | 0 |

TABLE IV

| FILE II AFTER CLUSTERING WITH ROW I |
|---|
| 1 |
| 2 |
| 3 |

The number of operations required for clustering is relatively small. Basically, each entry in File I is visited at most twice. Thus, the number of operations is approximately $J*N1$. A similar number of operations is required to initialize the linked list pointers of File I.

Hypothesis Generation

Having formed clusters, each cluster can now be handled independently. Thus, N1 is the number of tracks in the cluster, and H is the number of hypotheses formed from them. It is also assumed that the observation data belonging to the tracks in the cluster is relabelled. Taking the set of available observations from a cluster of tracks and labelling the distinct observations is basically a sorting problem where the number of things being sorted is $J*N1$.

(a) Quick Generation of a Plausible Hypothesis

The N1 tracks are sorted in score order. Again this requires $N1 \log_2(N1)$ steps. A logical array is formed in addition which is indexed by the distinct available observations.

Starting with the highest scoring track, the sorted list of tracks is now traversed, forming a hypothesis as the list is traversed. As new tracks are added to the forming hypothesis, the observation indexed logical array is changed from false to true at the indices of the observations of this track. The tracks that can be added to the forming hypothesis are those which are consistent with the hypothesis formed so far.

The test of consistency requires examining the values of the logical array at the indices of the track's observations. If they are all false, the track is consistent and can be added. Since the track list is in score sorted order, the highest scoring consistent track is always being added in.

This technique can be extended to generate multiple hypotheses by using as a first element the highest scoring track which did not appear in a previous hypothesis. The processing then proceeds as before. The sorting need not be repeated.

(b) Optimal Assignment for a Single Hypothesis

This problem has been studied in the graph theory literature. The *Tarjan* publication referenced above, at page 114, reports an algorithm which solves this problem in about $N*N*\log_3(N)$ steps.

(c) Bounded Search for Multiple Hypotheses

Partial hypotheses are grown by an iterative process. The number of iterations of these processing steps is no more than $(N+K)$. Based on the earlier assumption that the various parameters N,K,H,N1 are of the same order, the computational cost from this algorithm will be of the order N**3.

It is helpful to have explicit data structures representing track information and growing hypotheses. For hypothesis growing only a minimum of track information is needed: a track label (requiring $\log_2(N1)$ bits), a score, and a set of J observation labels that serve to indicate inconsistent tracks. Thus, the track data required for hypothesis generation is about $6*\log_2(N1)$ bits. The growing hypotheses themselves can be represented as two logical arrays: the first has size N1 and indicated which tracks are in the hypothesis; while the second has about J times as much data and indicates which observations belong to the hypothesis.

During each iteration all forming hypotheses are paired with each track, increasing the hypothesis size by 1. As each track is paired with a growing hypothesis, the consistency is checked by using the logical array indexed by the observation labels. If there is an inconsistency due to redundant observations, the new track is not added and the hypothesis score remains the same. (With this approach the growing hypotheses have length at most L after state L.) If the track is consistent with the growing hypothesis, a record of this new hypothesis is formed. For each iteration this step takes a small multiple of H*N1 steps. Table V illustrates the formation of two hypotheses H1 and H2, where L=3. H1 is defined by tracks T1, T2, and T5; H2 is defined by tracks T1, T4 and T5. In addition, tracks T7, T11 and T9 are consistent with the length L hypothesis H1; tracks T11 and T6 are consistent with the length L hypothesis H2.

TABLE V

| H1 | H2 |
|----|----|
| T1 | T1 |
| T2 | T4 |
| T5 | T5 |
| T7 | T11 |
| T11 | T6 |
| T9 | |

The mechanism for storing forming hypotheses can help the computation cost.

The length L+1 hypotheses are represented as a series of lists shown in Table VI which shows the length L+1 hypothesis after ranking and pruning.

TABLE VI

| H1 | H2 | H3 |
|----|----|----|
| T1 | T2 | T1 |
| T2 | T2 | T4 |
| T5 | T5 | T5 |
| T7 | T11 | T11 |

Each list is headed by a distinct length L hypothesis. The list contains the track records which are individually consistent with the hypothesis heading the list. The tracks are presented for evaluation in score order, and are sorted in this order in the list. If tracks have the same score, then they are ordered by track label.

The H highest scoring hypotheses of length at most (L+1) will be found and saved. The selection is aided by pointers to the next track to be considered from each list. To make the next hypothesis selection, one hypothesis is taken from each list (that is the top hypothesis augmented by the designated track). There are H hypotheses being considered. A maximal scoring hypothesis is found. If a hypothesis under consideration has a smaller scorer it is removed from consideration and its pointer is unchanged. If more than on hypothesis has the same score, distinct tracks are searched for. The hypotheses can be ordered by their constituent tracks consistent with the track order. The hypothesis with highest score and first order is taken, the pointers for all hypotheses with the same tracks are incremented, the rest of the pointers are left alone, and operation proceeds to the next iteration. Because N1 bits are being compared, the computation time for each of (N+K) iterations could be as high as H*N1*N1.

The H (in the example of Table VI, H=3) remaining hypotheses of length L+1 (L+1=4 in this example) are then extended in the same manner to L+2.

There is a technique to reduce the operation count to H*N1 at the cost of making a mistake with probability exceeding zero. The technique assumes that, like most real computers, integer operations have a fixed cost as long as the number of bits used to represent the integer is not too great. Track labels are assigned randomly in the range from zero up the maximum allowed integer. The processing proceeds as above, except that when hypotheses get the same score, they are distinguished based on the sum of the track labels (modulo the max integer) instead of the set of labels. The added cost of carrying the sum of the labels of the tracks in the length L hypotheses is inconsequential.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for multi-target tracking of targets for a sensor system generating a sequence of successive data frames, each comprising a set of observations representing data collected by the sensor system during a sensing period, comprising a sequence of the following steps:

receiving the first frame and setting up a set of tracks in dependence on the data comprising said first frame;

for each successive frame received, performing the following steps:

deleting stale data regarding said previously received frames;

processing the observations in the new frame to generate a new set of tracks based on said new set of observations as well as observations received from previous frames; and generating a fresh set of hypotheses each comprising a set of tracks such that no two tracks within any hypothesis have any observations in common.

2. The method of claim 1 wherein said step of deleting stale data comprises deleting the hypotheses, if any, generated for the previous frame, leaving an unstructured collection of tracks.

3. The method of claim 1 wherein said step of processing new observations comprises creating a set of K track records, one for each new observation comprising the new frame.

4. The method of claim 1 wherein said step of generating new tracks comprises considering all possible assignments of observations to tracks, assigning a score to each track indicative of the quality of the associations of the respective observations to the respective track, and recording the score for each track.

5. The method of claim 4 wherein said step of generating hypotheses comprises sorting the tracks in score order.

6. The method of claim 4 further characterized in that the score is a function mapping the tracks at frame n into non-negative score numbers, and in that each hypothesis has a score which is the sum of the scores of its tracks.

7. The method of claim 4 further comprising the step of harvesting said new set of tracks to eliminate relatively low scoring tracks from consideration.

8. The method of claim 1 wherein said tracks form a set Z, and further comprising the step of forming clusters (X(i)) of said tracks, wherein said clusters X(i) are subsets of Z, and, for i not equal to j, no track in cluster X(i) shares any observations with a track in cluster X(j).

9. The method of claim 8 wherein said step of forming clusters comprises:
setting up a first file containing a list of each track, for each such track and for each frame of a discrete set of frames, a pointer to another track which shares the same observation for the frame, and for each track a cluster label representing the cluster to which said track will be or has been assigned; and
searching said track list for tracks which have not been assigned to a cluster, and assigned each such track to a cluster including tracks which share an observation in any one of said frames with an observation comprising such track.

10. The method of claim 9 wherein a frame pointer of a track which does not share any observations with any other track for a given frame points to that track.

11. The method of claim 10 wherein said step of searching said track list comprises searching said pointers to find other tracks to be added to said cluster.

12. The method of claim 1 wherein each observation comprises first and second data address values, said first address value describing the quadrant.

13. A method for multi-target tracking of targets for a sensor system generating a sequence of successive data frames, each comprising a set of observations representing data collected by the sensor system during a sensing period, comprising a sequence of the following steps:
receiving the first frame and setting up a set of tracks in dependence on the data comprising said first frame;
for each successive frame received, performing the following steps:
deleting stale data regarding said previously received frames;
processing the observations in the new frame to generate a new set of tracks based on said new set of observations as well as observations received from previous frames;
adaptively selecting one hypotheses generation algorithm from a plurality of available algorithms in dependence on the number of tracks in said set; and
generating a fresh set of hypotheses by use of said selected algorithm, each hypothesis comprising a hypothesis set of tracks such that no two tracks within any hypothesis have any observations in common.

14. The method of claim 13 wherein said step of deleting stale data comprises deleting the hypotheses, if any, generated for the previous frame, leaving an unstructured collection of tracks.

15. The method of claim 13 wherein said step of processing new observations comprises creating a set of K track records, one for each new observation comprising the new frame.

16. The method of claim 13 wherein said step of generating new tracks comprises considering all possible assignments of observations to tracks, assigning a score to each track indicative of the quality of the associations of the respective observations to the respective track, and recording the score for each track.

17. The method of claim 16 wherein said step of generating hypotheses comprises sorting the tracks in score order.

18. The method of claim 16 further characterized in that the score is a function mapping the tracks at frame n into non-negative score numbers, and in that each hypothesis has a score which is the sum of the scores of its tracks.

19. The method of claim 16 further comprising the step of harvesting said new set of tracks to eliminate relatively low scoring tracks from consideration.

20. The method of claim 13 wherein said plurality of available algorithms comprises an exhaustive generation algorithm selected when the number of tracks is small, said exhaustive generation algorithm for generating all hypotheses consistent with said tracks.

21. The method of claim 13 wherein said plurality of available algorithms includes a bounded search algorithm for generating multiple hypotheses, wherein partial hypotheses are grown by an iterative process, and the number of iterations is no more than (N+K), where N is the number of old tracks and K is the number of new observations.

22. The method of claim 21 wherein:
during each iteration L, all forming hypotheses are paired with each track, increasing the hypotheses size by one;
as each track is paired with a growing hypothesis, a score for each pairing is computed, and a decision is made to add such track to this growing hypothesis in dependence on the pairing score; and
after L iterations, each growing hypothesis has a length of at most L tracks.

23. The method of claim 22 wherein after each iteration, the hypotheses are harvested to eliminate duplicate partial hypotheses.

24. The method of claim 13 wherein said plurality of available algorithms includes an algorithm for providing an optimal assignment for a single hypothesis.

25. The method of claim 13 wherein said plurality of available algorithms includes an algorithm selected when the number of tracks is large, and which produces a relatively quick generation of a plausible hypothesis.

26. A method for multi-target tracking of targets for a sensor system generating a sequence of successive data frames, each comprising a set of observations representing data collected by the sensor system during a sensing period, comprising a sequence of the following steps:
receiving the first frame and setting up a set of tracks in dependence on the data comprising said first frame;
for each successive frame received, performing the following steps:
deleting stale data regarding said previously received frames;

processing the observations in the new frame to generate a new set of tracks based on said new set of observations as well as observations received from previous frames;

for each cluster (X(i)), adaptively selecting one hypotheses generation algorithm from a plurality of available algorithms in dependence on the number of tracks in said set;

for each cluster (X(i()), adaptively selecting one hypothesis generation algorithm from a plurality of available algorithms in dependence on the number of tracks in said set; and forming clusters (X(i)) of said tracks, wherein said clusters X(i) are subsets of Z, and, for i not equal to j, no track in cluster X(i) shares any observations with a track in cluster X(j);

generating a fresh set of hypotheses by use of said selected algorithm, each hypothesis comprising a hypothesis set of tracks such that no two tracks within any hypothesis have any observations in common.

27. The method of claim 26 wherein said step of deleting stale data comprises deleting the hypotheses, if any, generated for the previous frame, leaving an unstructured collection of tracks.

* * * * *